United States Patent

[11] 3,545,592

| [72] | Inventors | James R. Burkholder<br>Ephrata;<br>Albert M. Best, New Holland, Pennsylvania |
|---|---|---|
| [21] | Appl. No. | 745,280 |
| [22] | Filed | July 16, 1968 |
| [45] | Patented | Dec. 8, 1970 |
| [73] | Assignee | Sperry Rand Corporation<br>New Holland, Pennsylvania<br>a corporation of Delaware |

[54] AUTOMATIC BALE ALINER
20 Claims, 7 Drawing Figs.

[52] U.S. Cl. ........................................... 198/33;
214/518
[51] Int. Cl. .......................................... B60p 1/36;
B65g 47/24
[50] Field of Search........................................... 198/7,
33(R1), 75—76, 82, 105, 29, 34; 214/518,
522(Inquired)

[56] References Cited
UNITED STATES PATENTS

| 1,972,489 | 9/1934 | Rideout.......................... | 198/34X |
| 2,327,494 | 8/1943 | Brown........................... | 198/7X(BL) |
| 2,771,176 | 11/1956 | Clark............................ | 198/29 |
| 3,412,884 | 11/1968 | Fischer......................... | 214/518 |

FOREIGN PATENTS

| 914,479 | 7/1954 | Germany...................... | 198/105 |

*Primary Examiner*—Edward A. Sroka
*Attorneys*—Joseph A. Brown and John E. Becker

ABSTRACT: This invention relates to article-alining devices for receiving and alining randomly discharged articles, and more particularly to the unloading of previously randomly loaded hay bales, and to automatically alining said bales in end to end fashion for delivery to bale elevators disposed in association with storage facilities.

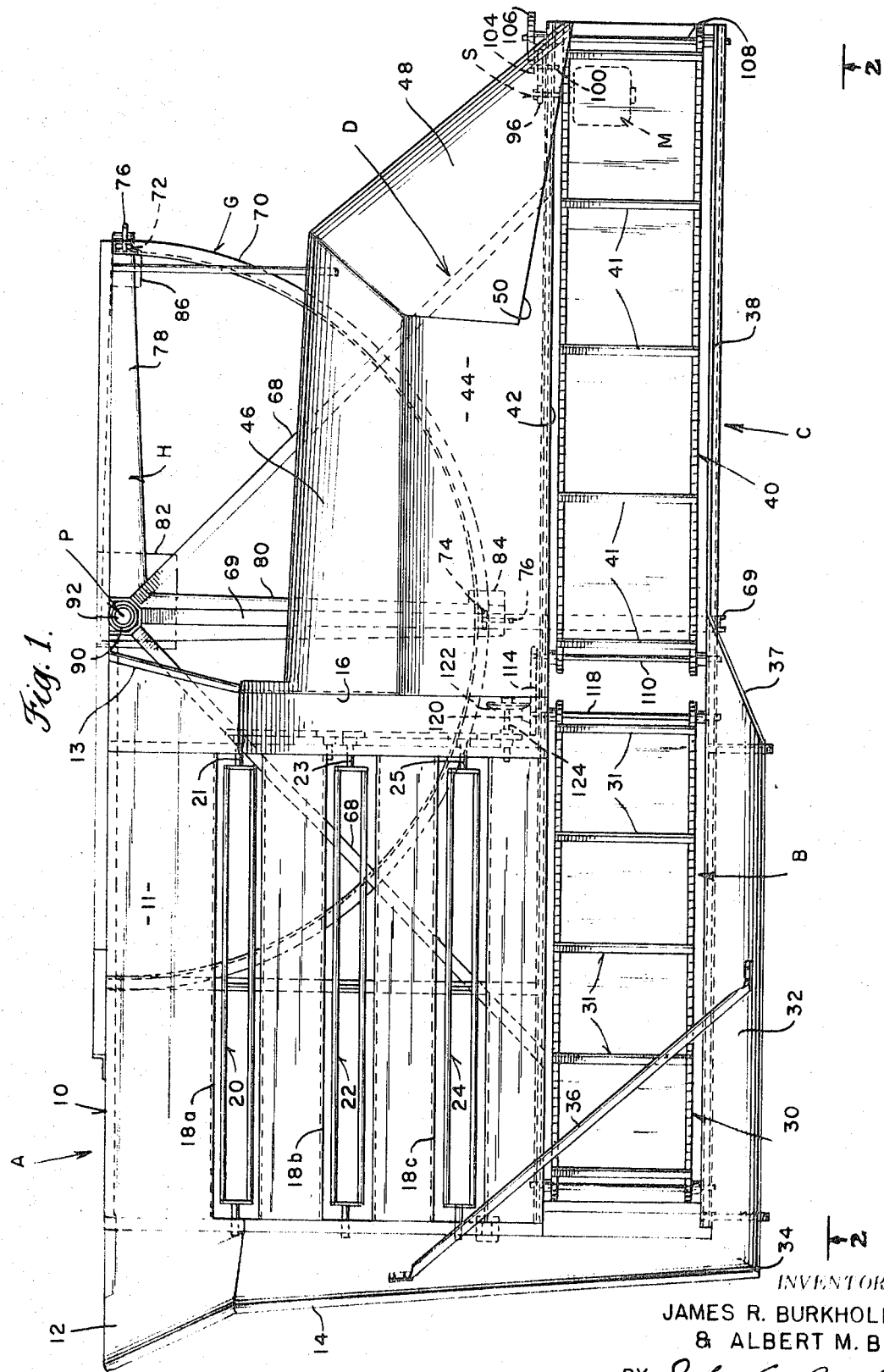

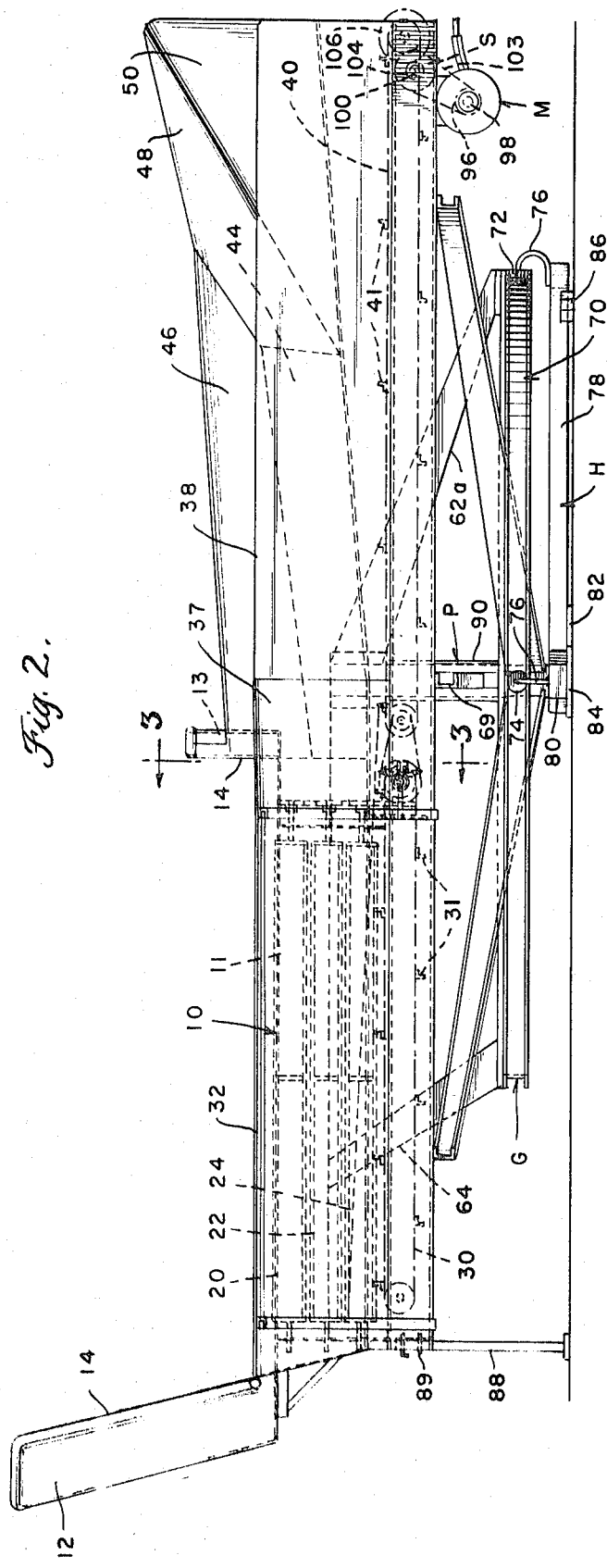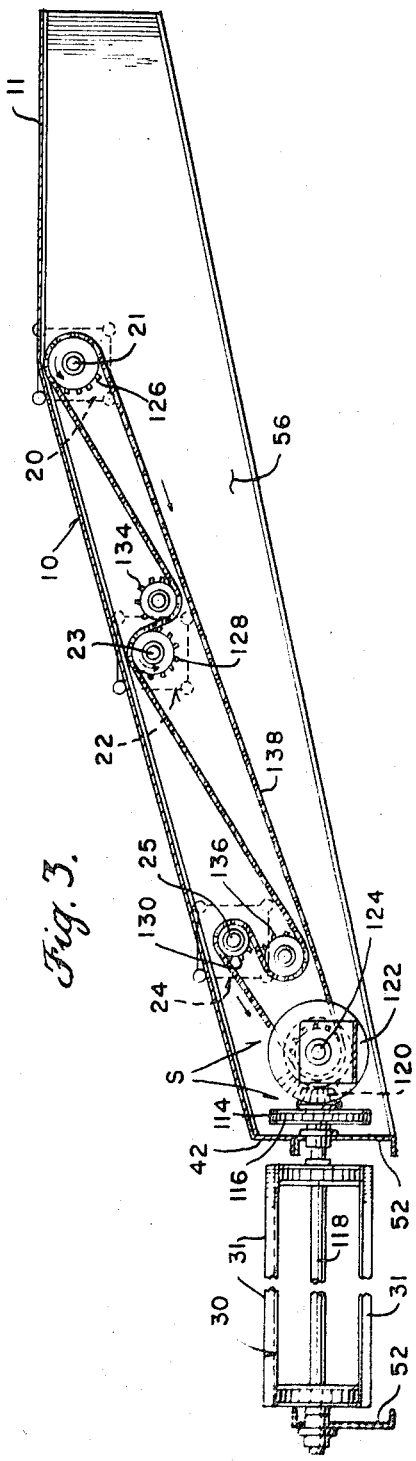

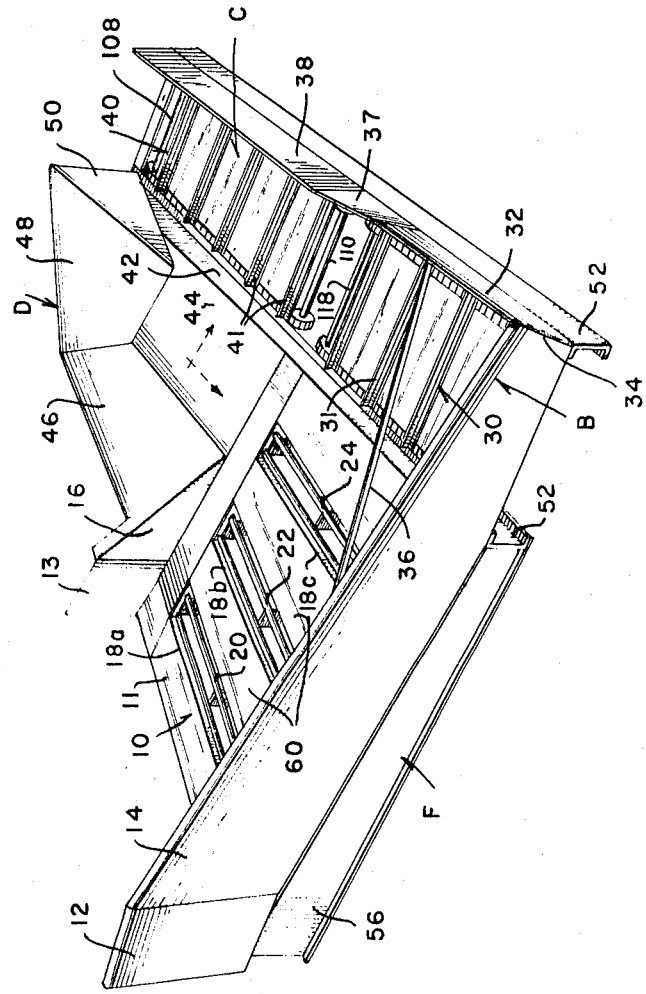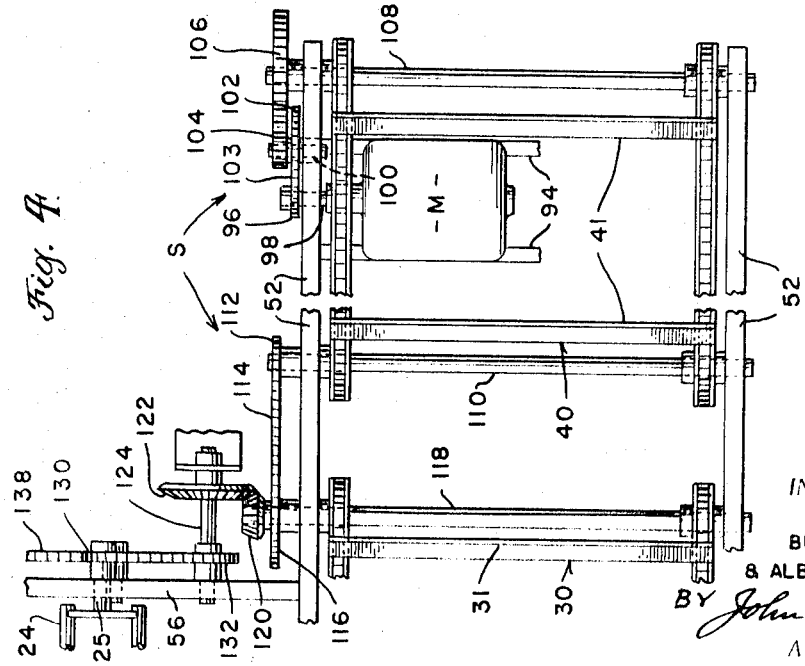

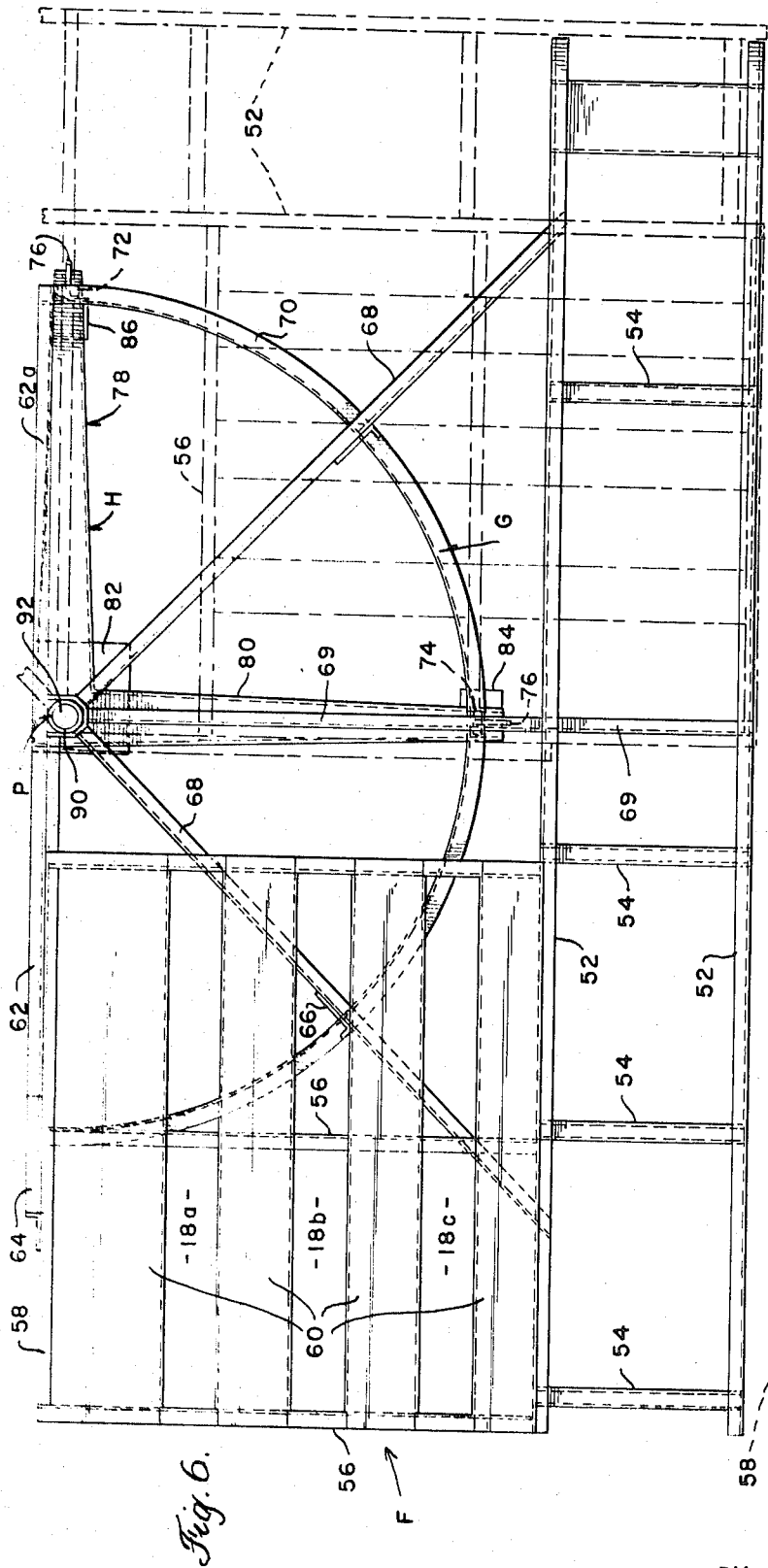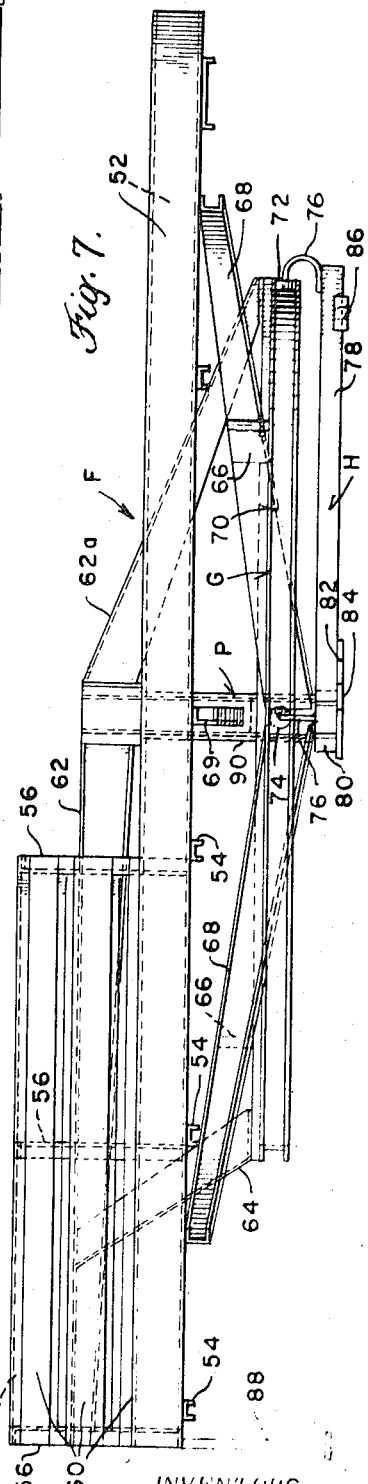

AUTOMATIC BALE ALINER

BACKGROUND OF THE INVENTION

With the advent of bale thrower apparatus used in conjunction with hay-baling equipment, the rate of speed in loading bales in the wagon during field operation has more than doubled. Automatic bale throwers attached to balers enable the bales to be thrown automatically from the baler onto a draft wagon attached thereto, said bales being received therein in random arrangement. While this development completely eliminated the need for a person in the wagon to stack the bales, a subsequent bottle neck developed after the more quickly loaded wagons were taken to the storage area and the bales were then either manually unloaded therefrom or discharged automatically in a randomly oriented pile adjacent the elevator, whereupon they had to be manually loaded into the elevator for conveyance into the storage facility.

SUMMARY OF THE INVENTION

This invention provides an irregular-shaped frame structure having a partial hopperlike receiving area into which the bales from the loaded wagon may be unloaded in the randomly oriented manner in which they were initially loaded onto the wagon. The present device further comprises preferably a downwardly inclined ramp having a plurality of laterally extended, successively spaced rotary assist members drivable at progressively increased speeds commencing with the uppermost and increasing in speed with those progressively down the ramp to the lowermost rotary member. Said rotary assist members particularly the first one, act to break up large bunches and dispatch the bales from the unloading area to an intermediate portion of the align device where the bales are at least partially oriented as they are received onto a laterally moving composite conveyor means. The inclined hopper style sides serve to confine and guide the randomly oriented bales therewithin during the initial unloading and the intermediate align procedure. The align device further comprises a plurality of irregular shaped, relatively inclined planar surfaces which further coact to orient the bales in a generally predetermined manner and to subsequently align the bales successively on the composite aligning conveyor system with the longitudinal axis of the bales coextensive with the longitudinal axis of said conveyor system. The laterally directed, aligning conveyor system comprises preferably a pair of endless conveyors disposed in an end-to-end manner and having means for driving said conveyors at different relative speeds and generally faster than the rotary assist members.

The variously inclined sides of the bale aligner, some of which form so-called dwell areas, are strategically designed to assure that the bales, irrespective of their attitude therewithin, are usually confined and continuously being directed to the said lateral conveyors, the latter being coordinated to the speed of the delivery of the bales from the wagon down the initial receiving ramp so that the bales are constantly moved out of the path of the oncoming bales that drop thereon from the wagon. However, it is possible, and at times desirable, for some bales to be pushed over the top of the dwell areas to prevent plugging of the unit, if large bunches unduly accumulate there in extreme situations.

The primary object of the present invention therefore is to automate the baling procedure from the field to the storage facilities.

Another principle object is to provide an automatic bale aligner for receiving the bales in a random manner, for orienting them in a relatively uniform pattern and delivering them in tandem arrangement to the elevator for conveying to the storage area.

Still another object of the present invention is to provide improved efficiency in the automated bale-handling operation, thereby eliminating the previous bottleneck at the unloading station and the need for a worker there to help reduce the bottleneck congestion.

Yet another object of the present invention is to provide a bale-aligning device which is mountable on a pivotal framework enabling the same to be rotated from its normal operating position out of the path of a tractor-drawn wagon as the wagon is drawn up to the elevator area. After the wagon is in the unloading position, the bale-aligning device is pivotally swung back into position adjacently behind the wagon and is ready for receiving the bales therefrom.

A still further object is to provide a relatively low cost, easily operable unit with a minimum of components which will facilitate delivering bales in a predetermined manner to the elevator at the storage area.

These and other objects will become more apparent from the following detailed description and the appended claims, together in conjunction with the illustrative patent drawings.

DESCRIPTION OF DRAWINGS

FIG. 1 is a plan view of the bale-aligning device constructed in accordance with the instant invention;

FIG. 2 is a side elevational view of the device as seen substantially on line 2–2 of FIG. 1;

FIG. 3 is an enlarged cross-sectional detail view taken substantially on line 3–3 of FIG. 2, illustrating certain parts of the drive system;

FIG. 4 is a fragmentary plan view of the drive system, and having certain medial portions broken away to facilitate the larger scale illustration;

FIG. 5 is a perspective view of the device, better showing the relative relationship of the rolls, conveyors and bale-deflecting baffles and sidewall members;

FIG. 6 is a plan view of the basic framework, with the pivotal frame also shown fragmentarily in dash and dot outline in its right-angle rotated position; and FIG. 7 is a side elevational view, similar to FIG. 2, of the basic framework of FIG. 6.

DESCRIPTION OF PREFERRED EMBODIMENT

Referring more particularly to the drawings, the automatic bale aligner comprises an unloading area A including a portion inclined downwardly toward a first cross conveyor area B extending transversely to and coextensive with the unloading area and terminating adjacent a second or aligning conveyor area C disposed in series with the cross conveyor B. Adjacent the unloading area A and aligning conveyor C there is a bale deflector and dwell section D. The four areas or sections A, B, C, and D compose the generally irregular rectangular device supported on a framework F which, in turn, is pivotally mounted about a vertical axis for rotation of approximately 90° on a semicircular trackway G dependently supported beneath the framework F but above a supporting base H, comprising the center post or pedestal P about which the framework F pivots. A motor M provides the power for the drive system S which drives the conveyors and a plurality of assist rollers in the unloading area A.

The unloading area or station means A comprises a bale-receiving platform preferably having a ramp 10 inclined downwardly from a short, level, initial portion 11. The unloading area A is of a width about the same as or slightly in excess of the width of a bale wagon to be unloaded thereinto. The ramp 10 may be inclined at an angle falling with the range of 10°—25, with one very acceptable setting being approximately 15°. While it is preferable to have an inclined ramp portion, the unloading platform can be substantially level inasmuch as positively driven rollers, to be described, are to be used in conjunction therewith. By inclining the ramp the bales are further assisted by gravity. The platform further includes a pair of outwardly flared, guide wings 12 and 13, with guide 12 adjoining the hopperlike wall 14 constituting a left end of the machine, as viewed in FIGS. 1, 2, and 5. Flared guide 13 adjoins a vertical, triangular-shaped wall 16 disposed opposite sidewall 14, as better seen in FIG. 5. The ramp platform 10 is provided with spaced slotways 18a, 18b and 18c. A corresponding number of rotary driven assist rollers 20, 22 and 24 are journaled in the respective slots 18a, 18b and 18c. Stub shafts support the ends of rollers 20, 22 and 24, with those at the right side, as viewed in FIGS. 1 and 3, being designated 21, 23 and 25, respectively. The lowermost assist roller 24 is rotatively driven faster than the second roller 22, and roller 22 rotates faster than the first roller 20 to accelerate the bales away from the unloading area. The drive for these assist rollers will be described hereinafter.

The assist rollers 20, 22 and 24 serve to dispatch the incoming bales away from the immediate unloading area into the cross conveyor area B, the latter of which includes a horizontally disposed, endless cross conveyor 30 disposed at the foot of the ramp 10 and adapted to move the bales in a lateral direction from that of which they are received. The cross conveyor 30 is provided with regularly spaced cleat bars 31 attached to the spaced drive chains thereof, and is of a length corresponding generally to the width of the bale-receiving area 10. Conveyor 30 is supported by the suitable framework F, and is operatively driven by means to be described hereinafter.

Another hopperlike guide wall 32 of shorter height is outwardly inclined in a manner similar to and adjoins with wall 14 of diminishing height in a mitred corner 34. A combined brace and bale deflector 36 may be utilized to tie together the outwardly flared walls 14 and 32. The deflector 36 may be in the form of a bar disposed at a height slightly in excess of the bales width and depth thickness, or, more preferably include a generally vertically depending, angularly disposed, panel portion terminating somewhat above the cross conveyor 32 to both deflect the bales and to preclude their wedging beneath the brace. In instances where the angularly disposed bar is desired without a depending baffle portion, the bar may act to further deflect the upper bales if the bales should have a tendency to move down the assist rollers one on top of the other. The brace 36 when in the form of a bar may be disposed at various angles to accommodate the particular needs of a given situation. Wall 32 extends generally the length of the conveyor 30, with the angle of inclination gradually approaching a vertical relation by tapering inwardly at 37 to form a merging guide portion with a vertically disposed guide wall portion 38 disposed closely adjacent to the aligning conveyor area C, the latter being generally a continuation of the cross conveyor area B. In lieu of the aforesaid angularly disposed tie brace 36, a plurality of generally vertically disposed braces may be affixed at spaced intervals to the outermost longitudinal beam or frame member 52 to support the guide walls 32 and 38.

The aligning conveyor area or moving orienting station means C further comprises a horizontally disposed endless conveyor 40, also having regularly spaced cleat bars 41, said conveyor also being suitably journaled within the framework F and coplanar with conveyor 30. Disposed opposite the vertical wall 38 is a shorter in height vertical wall 42 which coextends into the cross conveyor area B and defines the vertical base wall of the unloading platform 10, as well as the inside upper face of the open framework which supports the cross conveyor 30 and the aligning conveyor 40.

The bale deflector area or orienting station means D comprises a bottom panel or wall 44 which is inclined substantially the same as the inclined bale receiving platform 10 in the one direction, i.e. at approximately 15° and preferably within the range of 10°—25° and is inclined at an approximate angle of 5° or 6°, and preferably within the range of 4°—8°, in the other direction upwardly and laterally away from the ramp 10. The inclined bottom panel or surface 44 merges into a steeper inclined rear wall or surface 46, said rear wall in one successfully operated device being inclined at approximately 40° and preferably within the range of 30°—45°, said wall 46 terminating at one side with the vertical sidewall 16 of the unloading area and merging at the other side with an inclined bale deflector wall 48 disposed generally obliquely transverse to the walls 46 and 44, as better seen in FIGS. 1, 2 and 5. Bale deflector wall or surface 48 is shown inclined at approximately 35° and preferably within the range of 30°—45°. Wall 48 slopes obliquely toward and terminates in a vertically disposed front end wall surface 50 which is adjacent to and converges toward the discharge end of the aligning conveyor 40. The relative slopes of the respective wall panels will depend upon the coefficient of friction of material used in fabricating same, however, the panels must not be too steeply or too shallowly inclined or they will tend to induce rather than preclude jamming.

Referring to FIGS. 6 and 7, the framework F will be seen to include spaced parallel longitudinal channels 52,52 interconnected by a plurality of spaced transverse frame members 54 attached to the lower side of the channels, as seen in FIG. 7, thereby defining the framework within which the cross conveyor 30 and the aligning conveyor 40 are drivingly disposed. Extending transversely to and rearwardly away from the left end, as viewed in FIGS. 6 and 7, of the framework 52 are a plurality of upwardly inclined channel members 56, which are joined together in parallel by a rearward frame member 58 and a plurality of elongated spaced plate members 60 which constitute the surface of the inclined bale receiving platform 10 and also define the slotways 18a, 18b and 18c aforesaid. An elongated rearward frame member 62 is generally horizontally disposed beneath the ramp framework section and projects in laterally opposite directions from a medially disposed pedestal P, having one laterally directed portion 62a inclined downwardly and terminating above the ground support surface. The semicircular trackway G is supported at one side by frame portion 62a, and at opposite side by means of a brace 64 (FIG. 7), and further by supplemental braces 66 as better seen in FIG. 6. Suitable diagonally disposed braces 68,68 attach with one end of each fixed against opposite sides of the innermost longitudinal member 52, side braces converging downwardly toward and attach their other ends to the base of pedestal P. Braces 66 attach to the brace 68 and to the track G. An additional brace 69 attaches to and projects radially from pedestal P midway between braces 66, to help support the frame member 52.

The semicircular trackway G comprises a channel shaped track 70 disposed to receive therein at least two supporting rollers 72 and 74 disposed substantially 90° apart. While the illustrative embodiment depicts the track 70 disposed with its channel facing outwardly, it has been found that by disposing it inwardly, a larger diameter track may be utilized without interference to other components of the device, thereby giving added stability thereto, with said roller supports being disposed inwardly of the track. Said rollers 72 and 74 are rotatively supported upon arms 76 projecting up from the base H which in one form comprises generally right angularly disposed legs 78 and 80 having a center base support plate 82 and leg end anchor plates 84 and 86, respectively. It may be preferable to utilize three support roller assemblies disposed approximately 45° apart. The base H, in one embodiment, is rigidly anchored to a base floor or ground support by means of the apertured plates 82, 84 and 86, by any suitable anchor means such as anchor bolts, not shown. When in the operative position, an auxiliary, stabilizer leg 88 will be moved down about its pivotal mounting 89 (FIG. 2) from its retracted position in the framework F, to engage the ground support surface. It is apparent that pedestal P and the rollers 72 and 74 are the means upon which the framework F pivots the whole unit in a 90° counterclockwise direction from the operative position, shown in FIGS. 1 and 6, to the rotated position partially shown in dash-dot lines in FIG. 6. This 90° pivoting feature eliminates having to back the loaded bale wagon up to the unit, by permitting the wagon always to be drawn forwardly into position whereupon frame F is swung back into position adjacent the rear of the wagon for loading procedure. It is to be understood that the framework is attached to a sleeve 90 which is rotatively fitted about the pivot post 92 of the pedestal P.

It is contemplated that the complete unit in another preferred embodiment may be mobilized by the provision of transport wheels attached to a somewhat different base H, not shown, or to a nonrotating part of the frame F to facilitate its moving to various storage facilities.

Referring now more particularly to FIGS. 3, 4, 1 and 2, the drive system S for assist rollers and conveyors will be described in more detail. The drive power is derived preferably from an electric motor M attached in any suitable manner to frame support members 94 (FIG. 4) adjacently beneath or beside the discharge end of aligning conveyor 40. Motor M is provided with suitable drive means in the form of small drive sprocket 96 on its drive shaft 98. A rotatable jack shaft 100, mounted parallel to shaft 98 on inner longitudinal frame member 52, is provided with a large drive sprocket 102 and an adjacent small pinion gear 104, the latter meshing with and driving the larger pinion gear 106 carried on the shaft 108 of aligning conveyor 40. Drive chain 103 connects sprockets 96 and 102. The opposite end shaft 110 of conveyor 40 is provided with a smaller sprocket 112 disposed in alignment with and drivable connected by chain 114 to a larger sprocket 116 on adjacently disposed end shaft 118 of cross conveyor 30. It is to be understood that belt and pulley drive members may be interchangeably used in place of the intermeshing pinions or the chain and sprocket drive members, if desired.

By the foregoing arrangement, the aligning conveyor 40 provides means for driving the cross conveyor 30, with the ratios of the drive members enabling the aligning conveyor 40 to be driven at a higher rate of speed than the cross conveyor, in order to accelerate the bales to discharge them onto the elevator, not shown. Preferably the aligner conveyor C is running approximately two times as fast as the cross conveyor, and the aligner conveyor 40 is running equal to or slightly less than the speed of an elevator conveyor (not shown) used to convey bales away from the unit and into a storage facility.

The drive system further provides for driving the assist rollers 20, 22, and 24 located in the unloading ramp, as follows. The end shaft 118 of the cross conveyor 30 also carries a bevel pinion gear 120 outwardly adjacent the sprocket 116, said pinion 120 meshing with a larger bevel gear 22 suitably supported on a stub shaft 124 (FIG. 4) disposed parallel to the axes of the assist rollers. Each of the assist rollers 20, 22 and 24 are provided with stub shafts which suitably journal said rolls in the framework as aforesaid, said shafts projecting a short distance adjacent the cross conveyor 30 end of the framework and identified hereinbefore as parts 21, 23 and 25. Each of the stub shafts 21, 23 and 25 are provided with sprockets 126, 128 and 130 of progressively increasing diameter as better shown in FIG. 3. Stub shaft 124 also carries a sprocket 132 in alinement with the sprockets 126, 128 and 130. A pair of idler sprockets 134 and 136 are rotatably mounted coplanar with and adjacent to sprockets 128 and 130 as shown in FIG. 3 and around which drive chain 138 is trained in the manner shown therein to provide ample driving engagement with the respective drive sprockets of the assist roller members.

The assist rollers 20, 22 and 24, may be of any suitable construction, but as shown, each comprise spaced apart, generally square end plate members to which a plurality of four elongated rod members are attached to form a generally square sided rotating member which is disposed relative to the surface of the ramp 10 in such a manner that the elongated rods constituting the square corner peripheral surface thereof project slightly above the ramp 10 and initial receiving platform 11 during rotation, so that they engage, lift and frictionally pull bales engaged therewith away from the immediate receiving area and down the ramp way at progressively increased speeds as the bales progressively engage the subsequently faster driven rollers 22 and 24. The rollers may be formed also by bending the ends of the rod members inwardly to form converging radial spokes, to the juncture of which the stub shafts may be attached. Accordingly no square end plate members need be used.

OPERATION

With the bale aligning device of the present invention placed in position with the discharge end of the aligning conveyor disposed adjacent the elevator conveyor, not shown, and with the bale wagon drawn into its predetermined position adjacent its receiving area A of the aligning device, the bales are deposited onto the unit from a self-unloading wagon, sometimes in fairly large bunches of 10 to 12 bales at a time. The bales are assisted in their movement down the 10°—25° slope section of the unloading area by the three assist rollers to the cross conveyor area B. These assist rollers, particularly the first one, aid in breaking up the large bunches of bales as they are moved onto the aligning device from the wagon. The bales are moved from the cross conveyor 30 onto the aligner conveyor 40 which discharges them onto the elevator, not shown. Bales entering the cross conveyor in an end first manner are turned 90° due to the relative speeds of the two conveyors. The relative speeds of the assist rollers and conveyors are such that the bales will be accelerated as they pass through the aligning device. Therefore, the third assist roller is rotating faster than the second, and the second roller is rotating faster than the first at the top of the ramp. Further, the cross conveyor 30 is running at a speed great enough to prevent buildup of the bales at the lower end of the ramp, and the aligner conveyor 40 is running approximately two times as fast as the cross conveyor. The aligner conveyor 40 is running equal to or less than the speed of the elevator used to convey the bales to the storage facility.

The slanted wall guide 32 of the cross conveyor and the side hopperlike wall 14 of the unloading area, help prevent bales from bridging, or if they should bridge across the conveyor, it will allow oncoming bales to push them onto the cross conveyor with relative ease. The area adjacent the conveyor C between the unloading area A with its assist rolls, together with the bale deflector panel 48 is used as a dwell area D. In the event one or more bales are not properly oriented as they move across the aligner conveyor 40, they will come into contact with the bale deflector and guide walls which will either orient them properly before discharge, or deflect them into the said dwell area D and thence back into the aligner conveyor when it is clear of other bales. The dwell area and bale deflector slope toward the aligner conveyor 40 in such a manner that the bales automatically slide back down onto said conveyor when it is free of bales. The purpose of the 30°—45° sloped panel sections 46 and 48 is to accelerate bales more rapidly from the areas furtherest away from the conveyor. The steadily rising bottom panel 44 in the direction of the aliner conveyor and the rising shoulder line defined by the juncture of panels 44 and 42, together with panels 48 and 50, serve to positively orient the moving bales resting obliquely thereagainst into their correct upright longitudinally aligned position on said conveyor. The converging guide wall portion 37 serves to help axially align a bale with said aligning conveyor C, as does the converging face wall 50 of the deflector and dwell section D.

For those bales which fall from the unloading wagon in a manner with their longitudinal axis parallel to the axis of the assist rollers, it will be seen that the bales will be moved onto the cross conveyor in the normally desired position and will be carried laterally via the aligner conveyor C and discharged into the storage elevator conveyor means (not shown). Accordingly, the bale always will be turned so that its axis is parallel to the longitudinal axis of the conveyor system irrespective of the orientation it has when it is discharged from the bale wagon.

This device has been operated very satisfactorily with no jamming. Jamming is precluded inasmuch as the bales may be pushed over the top of the dwell area if large bunches should accumulate here under extreme situations. It is apparent that with this device no operator other than the wagon operator bringing his wagon to the storage facility need be in attendance, and then to only possibly guide some of the bales into the aligner area if they are stacked too high on the wagon, and to control the drive motors for the elevator and the aligner and the wagon. Usually the elevator conveyor is started first and once it is operating satisfactorily, the aligner conveyors driven by motor M are then started. The operator then starts the unloading system from the wagon. The unloading rate from the wagon should be reasonably controlled and coordinated with the speed of the storage elevator to prevent any potential bottleneck of the bales at the latter.

When the unloading of the wagon is complete, the auxiliary stabilizing leg 88 can be folded up out of engagement with the ground, and the unit manually rotated on its rollers 72 and 74 approximately 90°, as shown partially in dash-dot outline in FIG. 6, to permit the next wagon to be drawn into position, whereupon the unit is rotated back into position to repeat the cycle again. The wheeled embodiment lends unlimited mobility to the aligning device.

Accordingly, an improved bale aligning device has been evolved which operates effectively and efficiently, and which achieves all of the objects and advantages set forth in the specification.

While a specific embodiment of the invention has been described and illustrated, it will be understood that it is capable of modification, and it is intended to cover any variations, uses or adaptations following, in general, the principles of the invention and including such departures from the present disclosure as come within known or customary practice in the art to which the invention pertains, and as fall within the scope of the invention or the limits of the appended claims.

We claim:

1. An orienting and unloading device for use in conjunction with the unloading of transport vehicles having randomly loaded, elongated, rectangular-shaped, three-dimensional objects thereon, comprising in combination:
   a. an unloading station means for initially receiving discharged objects from the unloading end of a transport vehicle and having object passing end and side portions;
   b. means in said unloading station means for positively moving randomly arranged discharged objects to said object passing end on to a moving orienting station;
   c. a moving orienting station means including conveyor means having longitudinal axis of its run disposed transversely to that of said unloading station means and said positively moving means, said conveyor means having a receiving side with a portion adjacent the unloading station means and a discharge end remote thereof; and
   d. an orienting station means including surface means disposed adjacent said object passing side of said initial receiving station means and said conveyor means along said receiving side, said surface means including portions inclined laterally toward said conveyor means and converging toward the discharge end of the conveyor to direct the orient the objects in elongated, end-to-end fashion on the conveyor.

2. An orienting and unloading device as defined in claim 1 wherein the means of paragraph (b) for positively moving the objects towards said orienting station means including power-driven antifriction means.

3. An orienting device as defined in claim 1 wherein said conveyor means of paragraph (c) include first and second endless conveyors disposed in an end-to-end relationship; and means for driving said conveyors means at relatively different speeds with said conveyor means furthest from the receiving station being driven at a speed substantially faster than said second conveyor means adjacent said unloading station means.

4. An orienting and unloading device as defined in claim 1 wherein said surface means of paragraph (d) include an object guiding wall disposed vertically adjacent said conveyor means opposite said inclined and converging surface portions.

5. An orienting and unloading device as defined in claim 1 wherein:
   a. said means of paragraph (b) for positively moving objects away from said unloading station means including power-driven antifriction means;
   b. said conveyor means of paragraph (c) including first and second endless conveyors disposed in an end-to-end relationship; and drive means for driving said conveyors at relatively different speeds with said second conveyor furthest from said unloading station means being driven at a speed substantially faster than said first conveyor adjacent said unloading station means; and
   c. said antifriction means and said conveyors having an interconnected drive system and a common primary power source for driving the system.

6. An object-orienting device comprising in combination:
   a. a frame including a receiving station having outwardly flared sidewall means and floor means terminating in a forward edge and including means for positively dispatching rectangular three-dimensional objects received therein,
   b. means disposed adjacent the receiving station for receiving said objects, said means including extended conveyor means having a first part and a second part disposed with the longitudinal run thereof transverse to the axis of the receiving station, and with the second part extending beyond the first part a length equaling at least the transverse width of said floor means of the receiving station; and
   c. composite aligning and multiangle deflecting panel means disposed adjacent both the receiving station and the extended conveyor means constituting combined object aligning and object dwell means.

7. An orienting device as defined in claim 6 further including interrelated drive means associated with the means of paragraph (a) for positively dispatching the and with the conveyor means of paragraph (b) for driving said conveyors; said drive means including a common power source on the device.

8. An orienting device as defined in claim 6 wherein the means for positively dispatching the objects of paragraph (a) thereof include rotary conveyor means having their axis of rotation parallel to the longitudinal run of the extended conveyor means of paragraph (b); and the conveyor means of paragraph (b) include first and second individual conveyors disposed in a generally horizontal, end-to-end manner.

9. An orienting device as defined in claim 6 wherein the composite alining and deflecting panel means of paragraph (c) include:
   1. an outwardly flared front wall adjacent the first part of the conveyor means and on the front side of the conveyor means opposite the base of the floor means, said front wall complementally adjoining the end of the sidewall means and means bracing said front wall to withstand the impact of oncoming objects;
   2. a vertically disposed front wall generally coextensive with but spaced from the aforesaid outwardly flared wall of paragraph 1; said vertical front wall disposed adjacent the length of the second part of the conveyor means; and
   3. a generally vertical intermediate tapered wall section interconnecting the adjacent spaced ends of the outwardly flared and vertically disposed front walls.

10. An orienting device as defined in claim 9 further including:
   1. a lower floor panel having a front and rear edge disposed with a front edge adjacent a second part of the conveyor means and coextensive with the forward edge of the floor means of the receiving station aforesaid, said lower floor panel being inclined upwardly both from front to back and from end to end;
   2. an inclined rear wall panel adjoining the rear edge of the lower floor panel and inclined more steeply upwardly and away from said floor panel;
   3. an inclined end panel adjoining both of the aforesaid panels, said end panel adjoining an end portion of said rear wall in a mitred corner and disposed generally transversely to said rear wall panel;

4. said end panel being inclined relatively steeply up and away from the upper lateral inclined end of the floor panel and inclined less steeply from rear to front; with the forward portion of the end panel terminating in a downwardly turned, substantially vertical front wall portion of triangular figuration when viewed in front elevation; and 5. said front wall portion intersecting the lower floor panel and disposed with the plane thereof inclined in a converging manner toward the discharge end of the second part of the conveyor.

11. An automatic bale-aligning device for receiving randomly arranged rectangular bales and delivering them to a storage elevator, comprising in combination:
   a. a frame including a hopperlike receiving station having outwardly flared sidewall means and a downwardly inclined floor means including antifriction means to facilitate the dispatch of the bales received therein away from said receiving station;
   b. conveyor means including a load-receiving portion disposed outwardly adjacent the base of the inclined floor means and extending transversely along and a substantial distance beyond the width of the inclined floor means and including a discharge end remote from the loading area;
   c. composite alining means including multiangled bale-deflecting panel means adjacent both the receiving station and the extended portion of the conveyor means constituting a combined bale alining and bale dwelling station; and
   d. interrelated drive means associated with the antifriction means of paragraph (a) and with the conveyor means of paragraph (b) for driving same.

12. The bale-aligning device of claim 11 wherein the drive means of paragraph (d) includes a common primary power source therefore.

13. The bale-aligning device as defined in claim 11, wherein the antifriction means includes at least one elongated rotary member disposed with its axis transverse to the direction of travel of the bales down the floor means of the receiving station, and having axially extended peripheral portions rotatably projectable slightly above the floor surface to engagingly drive the bales down the floor means.

14. The bale-aligning device as defined in claim 11 wherein the conveyor means includes coplanar disposed first cross conveyor means and a second alining conveyor means disposed in end-to-end relationship; said first conveyor means being disposed adjacent the initial receiving station and the second conveyor means adjacent the bale-aligning and dwelling station.

15. The bale-alining device as defined in claim 11 wherein the antifriction means include a plurality of elongated rotary members disposed with the axis of each parallel to each other and to the run of the first conveyor means of paragraph (b) but disposed transversely to the direction of travel of the bales down the inclined floor means.

16. A bale-aligning device as defined in claim 15 wherein the drive means includes rotary drive members coaxially connected to each of the rotary antifriction members, and means for driving same, with the relative ratios of the diameters of the drive members being such that the rotary antifriction members are driven progressively faster in proportion to their progressive distance away from the mouth of the receiving station.

17. A bale-aligning device as defined in claim 16 wherein the conveyor means include coplanar disposed end-to-end first and second conveyor means including rotary drive members thereon interconnected by endless drive means; said rotary members having drive ratios providing the first conveyor means with a speed greater than the antifriction rotary members, and providing the second conveyor means with a speed substantially in excess of that of the first conveyor means.

18. A bale-aligning device as defined in claim 17 wherein the composite alining and deflecting panel means of paragraph (c) of base claim 11 includes:
   1. an outwardly flared wall adjacent the first part of the conveyor means on the side of the conveyor means opposite the base of the inclined floor means, said wall means complementally adjoining the end of the outwardly flared sidewall means of paragraph (a) of base claim 1; and
   2. means including an angularly disposed bale-deflecting member interconnecting and bracing said flared walls.

9. A bale-aligning device as defined in claim 18 wherein the bale-deflecting means of the bale dwelling station includes:
   1. a floor panel having generally parallel front and rear edges with the front edge coextensive with the base of the receiving station and disposed spacedly adjacent the substantially extended part of the conveyor means, said floor panel inclined upwardly from both front to back and from end to end;
   2. an inclined rear wall panel adjoining the rear edge of the floor panel and inclined more steeply upwardly and away from said floor panel; and
   3. an inclined end panel adjoining both of the aforesaid panels and disposed obliquely and inclined with respect to the rear wall and floor panels, said end panel being inclined relatively steeply laterally up and away from the adjoining end of the floor panel but inclined less steeply from rear to front toward said extended part of the conveyor means.

20. A bale-aligning device as defined in claim 19 wherein the end panel of subparagraph 3 has a front edge terminating in a substantially vertical wall portion terminating on a line obliquely to and substantially coextensive with the front edge of the floor panel, and said vertical wall disposed with the plane thereof inclined convergingly toward the discharge end of the second part of the conveyor.